United States Patent Office 3,838,195
Patented Sept. 24, 1974

3,838,195
PROCESS FOR MAKING CRYSTALLINE, NON-SOLVATED ALUMINUM HYDRIDE
Paul F. Reigler and Reinhold Hellmann, Midland, Mich., assignors to The Dow Chemical Company, Midland, Mich.
No Drawing. Filed Oct. 23, 1967, Ser. No. 678,486
Int. Cl. C01b 6/00
U.S. Cl. 423—645                4 Claims

ABSTRACT OF THE DISCLOSURE

An improved process for preparing macrocrystalline, substantially non-ether solvated aluminum hydride wherein an ethereal aluminum hydride reactant solution is introduced into a crystallizing liquid having a boiling point higher than that of the ether but below 80° C. and the resulting conversion liquid is maintained at a predetermined boiling point with the ether volume being controlled to a maximum of 8% of the liquid whereupon non-solvated aluminum hydride crystals nucleate and grow therein.

BACKGROUND OF THE INVENTION

Non-solvated, crystalline aluminum hyride has been found to be suitable for use as a fuel component in solid rocket propellants.

A number of methods are known for making various polymorphic crystalline phases of aluminum hydride. In general, these processes employing an alkyl ether as a solvent have the disadvantage that the resulting products are contaminated with impurities and are essentially all in a very fine state of subdivision, e.g. submicron in size, which renders these undesirable for propellant applications. Also, the resulting products as produced are solvated and the solvent member, e.g. ether, is removed with difficulty ordinarily by high vacuum techniques.

A novel process for preparing relatively large size, i.e. from about 10 to about 50 microns and larger, crystalline aluminum hydride particles (hereinafter sometimes referred to as macrocrystalline particles) which are substantially non-ether solvated has been disclosed in a copending U.S. patent application Ser. No. 234,275 of Donald L. Schmidt and Ronald W. Diesen, filed Oct. 23, 1962.

In accordance with the process of application Ser. No. 234,275, an ether soluble aluminum hydride is formed, or a previously prepared ether soluble aluminum hydride material is redissolved, in an ether solvent, preferably in the presence of a complex metal hydride which is soluble in the ethereal solution, to provide a solution having an $AlH_3$/ether ratio of from about 0.05 to about 1 on a gram mole basis. The solvent can be any of those ether materials which act as a solvent for the aluminum hydride, including for example, diethyl ether, tetrahydrofuran and the like.

Substantially non-solvated large-sized, particulate, crystalline aluminum hydride particles ranging from about 10 to about 50 microns or larger form directly in the reaction solution if the temperature is maintained at from about 50 to about 85° C. and preferably at from about 60 to about 80° C., and most desirably at about 75–77° C. This result was unexpected in view of the fact that the product obtained from the same solutions at lower temperatures was substantially completely solvated and of undesirably small sized, e.g. sub-micron, particles.

In carrying out this process with low boiling ether solvents the desired crystallization temperatures are obtained either by controllably increasing the pressure on the solution while heating thereby to raise the effective boiling point of the solution and give a predetermined reaction temperature. Alternatively, and preferably, an inert organic solvent having a higher boiling point than the ether, and preferably above about 80° C., is admixed with the ethereal solution in sufficient quantity to provide a solution having a boiling point of at least 50° C. without the need for use of superatmospheric pressure. Liquid hydrocarbons, preferably having a boiling point of above 80° C., such as for example, benzene, toluene, biphenyl, xylene, biphenyl benzene, decane and the like were found by Schmidt and Diesen to be particularly suitable.

One advantage of the process disclosed in application Ser. No. 234,275 is that by controlling the reaction conditions relative to the treatment of the heated solvent during the crystallization step high concentrations of macrocrystalline particles of substantially non-solvated aluminum hydride in preferential and predetermined phases are formed in the reaction mass. In particular, if the solution is concentrated by removal of the lower boiling component, i.e. the ether, of a solvent mixture during the elevated temperature treatment, predominantly there is produced large crystals of a substantially solvent-free hexagonal aluminum hydride having a density greater than about 1.4 grams per centimeter and a unique X-ray diffraction pattern. This novel aluminum hydride has been disclosed in a copending application Ser. No. 179,509 of Norman E. Matzek and Donald F. Musinski, filed Mar. 8, 1962 and is identified therein as alpha-aluminum hydride.

This particular aluminum hydride, especially in large macrocrystalline size particles, has been shown to be especially suitable and effective as a fuel component in solid propellants. The large crystals themselves offer ease of handling and storage both from the standpoint of formulation and safety. They show a markedly decreased reactivity in air and increased resistance to flashing and burning over that exhibited by sub-micron particles. Further, when used in propellant formulations, these large hexagonal crystals exhibit excellent compatibility and blendability with the other ingredients employed in the formulation.

In practice of the process disclosed in application Ser. No. 234,275, the large, hexagonal crystals of aluminum hydride ordinarily are crystallized from an ether-benzene solution maintained at from about 75°–80° C. Specific studies have shown a benzene-diethyl ether solvent mixture containing about 5.7 volume percent diethyl ether and having a reflux temperature of about 76.5° C. gives optimum crystal size and excellent yields of the desired substantially non-solvated hexagonal crystalline aluminum hydride.

It now has been found that the long term thermal stability of such crystalline aluminum hydride materials apparently is interrelated with a number of variables affecting nucleation and crystal growth including temperature of crystallization and residence time in the crystallizer. Accordingly, it is a principal object of the present invention to provide an improvement in the process disclosed in application Ser. No. 234,275 whereby optimum recoveries in large crystal hexagonal, substantially non-solvated aluminum hydride is realized using lower boiling point solvent mixtures than have been employed heretofore.

It is also an object of the present invention to provide an improvement in a process for preparing macrocrystalline alpha-aluminum hydride employing specific solvent systems having boiling points lower than the bezene-diethyl ether system commonly used.

SUMMARY

In general, the present process comprises providing an aluminum hydride dissolved in an ether solvent, preferably in the presence of a complex metal hydride which is soluble in the solution, wherein the solution has an AlH$_3$/ether ratio of from about 0.05 to about 3 on a gram-mole basis. For solutions above about 0.3 molar with respect to the aluminum hydride, the reactant solution is maintained at a reduced temperature of from about minus 5 to about minus 30° C. to assure no premature crystallization of an ether solvated aluminum hydride in the reactant solution.

The resulting ethereal aluminum hydride feed solution is introduced at substantially atmospheric pressure into a predetermined crystallizing solvent having a boiling point below 80° C. but higher than that of said ether to provide a conversion solution having a normal boiling point of from about 45° C. up to the boiling point of the crystallizing solvent and usually a boiling point of from about 60 to about 73° C. The rate of addition of ethereal reactant solution into the crystallizer and excess ether removal further is controlled so as to provide a maximum of about 8 volume percent ether in the conversion solution. By controlling the ether content in the conversion liquor at this level, it has been found that the formation of aluminum hydride products other than the preferred macrocrystalline alpha particle is substantially eliminated.

The resulting reaction mixture is maintained within this predetermined temperature range whereupon substantially non-solvated, hexagonal, crystalline, alpha-aluminum hydride in macrocrystalline size particles nucleate and grow therein. These particles readily are recovered from the residual liquid solution by conventional liquids-solids separation techniques.

DESCRIPTION OF PREFERRED EMBODIMENTS

In the actual practice of the present invention, ordinarily a diethyl ether solution of aluminum hydride ranging from about 0.1 to about 0.3 molar with respect to aluminum hydride and containing dissolved therein complex metal hydride having an empirical formula, $M_1M_2H_4$ wherein $M_1$ and $M_2$ are atoms of different metal cations the sum of which equals 4 is employed as the aluminum hydride reactant source material. The amount of complex metal hydride is such so as to provide a complex light metal hydride/aluminum hydride gram mole ratio of from about 0.025 to about 1 and preferably from about 0.25 to about 0.5 based upon the aluminum hydride in the solution.

The diethyl ether aluminum hydride-complex metal hydride is controllably added to a crystallizing liquid having a boiling point above that of the diethyl ether while maintaining the temperature of the reaction mass within the range of from about 60 to about 73° C. and the volume percent ether at a maximum about 6 percent, most desirably about 5.7 percent of the total volume of the resulting conversion solution. In particular, crystallizing liquids based on an azeotrope of 1 part by volume benzene to 1.15 parts by volume cyclohexane (B.P. 77.4° C.), an azeotrope of 1 part by volume benzene to 1.35 parts by volume 2,4-dimethyl pentane (B.P. 75.4° C.), a 1:1 volume mixture of benzene:n-hexane (B.P. 72° C.), and n-hexane (B.P. 68° C.) have been found to be especially effective. When each of these is admixed with the ether reactant solution and the ether concentration controlled to provide a total ether volume of about 5.7 percent, the reflux temperatures of the resulting conversion solutions respectively are 73.5° C., 71.5° C., 68.5° C. and 64.5° C.

The resulting reaction mass is maintained at the predetermined temperature until a desired concentration of the macrocrystalline alpha-aluminum hydride product autocrystallizes in the reaction mass. Reaction times of from less than about one hour to 6 hours or more are satisfactory with very good yields being obtained at a minimum reaction time of about 2 hours.

In one embodiment, the ether solution is added to a crystallizing liquid which is at reflux while maintaining the temperature constant through ether distillation until crystal nucleation is realized. The ether solution addition then is continued without ether removal; this produces a gradual drop in conversion solution temperature. As the predetermined crystal growth temperature is reached, as determined by the quantity of ether desired in the conversion liquid, ether removal is again started and the reflux temperature maintained throughout the remainder of the run. Alternatively, a predetermined amount of ether initially can be admixed with the crystallizing liquid to provide a desired reflux temperature and the ethereal solution added to this conversion solution while simultaneously removing a corresponding amount of the ether therefrom.

The aluminum hydride reactant usually employed is the reaction product resulting from the well-known reaction of aluminum chloride (AlCl$_3$) and lithium aluminum hydride (LiAlH$_4$) in an aliphatic ether, e.g. diethyl ether. Ether solutions of aluminum hydride produced by any other process also can be used. Further, a solid ether solvated aluminum hydride can be redissolved in an aliphatic ether and this solution then be used as the initial aluminum hydride reactant in the present novel process.

Usually, a complex metal hydride corresponding to the empirical formula $M_2^{+1}M_2^{+3}H_4$ such as for example, LiAlH$_4$, LiBH$_4$, NaAlH$_4$, NaBH$_4$, or mixtures thereof, is incorporated into and dissolved in the aluminum hydride reactant solution to provide the complex metal hydride/AlH$_3$ gram mole ratio described hereinbefore. For those solutions wherein the macrocrystalline aluminum hydride is to be recovered directly from a reaction product mixture, for example, by reacting AlCl$_3$ and LiAlH$_4$ in diethyl ether, the amount of $M_1^{+1}M_2^{+3}H_4$ complex hydride to be employed is to be in excess of the LiAlH$_4$ required stoichiometrically for the preparation of the aluminum hydride reactant.

For optimum in product yield and purity, all processing and material handling, both of reactants and products, is carried out in a substantially anhydrous inert atmosphere.

The macrocrystalline particles produced by the present improvement exhibit a good resistance to degradation upon storage.

The percent invention is illustrated further by the following examples, but is not meant to be limited thereto.

EXAMPLE (a) In an inert nitrogen atmosphere dry box maintained at less than 10 parts per million each of water and of oxygen, about 28 milliliters of 1.08 M lithium aluminum hydride solution (1.15 g. LiAlH$_4$) and 75 milliliters of substantially anhydrous diethyl ether were placed in a 250 milliliter beaker. This solution was agitated and 11 milliliters of 0.91 M aluminum chloride (1.34 g. AlCl$_3$) and 10 milliliters of additional diethyl ether slowly added. This provided essentially a stoichiometric molar relationship of 3 LiAlH$_4$/1 AlCl$_3$ as required for production of aluminum hydride. Following completion of the aluminum chloride and ether additions, the reaction mixture was stirred for approximately two minutes and by-product solid lithium chloride separated by filtering. The ether filtrate solution which was approximately 0.3 molar in aluminum hydride was recovered and about 0.1 gram of sodium aluminum hydride was added to the solution and the mixture stirred for about 7 to 10 minutes to assure completion of the reaction and precipitation of inorganic halide salt by-product. The mixture was again filtered through a medium porosity sintered glass frit, the ethereal aluminum hydride product filtrate being collected and saved in an addition funnel.

A mixture of one part by volume benzene to 1.15 parts by volume cyclohexane was prepared. This composition is an azeotrope boiling at 77.4° C. Seven hundred milliliters of this azeotrope which previously had been dried with lithium aluminum hydride were combined with 5 milliliters of 1.08 M lithium aluminum hydride solution (5.4 millimoles LiAlH₄), 5 milliliters of 0.96 M lithium borohydride solution (4.8 millimoles LiBH₄) and 3 milliliters of diethyl ether in a three-necked distillation flask to provide a conversion solution. The diethyl ether constituted about 4 volume percent of this solution.

The flask containing the conversion solution was attached to a distillation column and the addition funnel containing the aluminum hydride reactant feed solution attached to the flask. The flask also was fitted with a thermometer and a mechanical stirrer.

The conversion solution was heated to reflux at atmospheric pressure and exhibited a reflux temperature of 7.45° C.

Approximately 20 milliliters of the aluminum hydride reactant solution was added at a rate of from about 0.7 to about 2.5 milliliters per minute to provide for nucleation of aluminum hydride in the conversion solution while maintaining the temperature of the reaction mass at 74.5° C. through ether removal. Following completion of the nucleation step, aluminum hydride reactant solution was added without ether removal, until the temperature reached 73° C. at a diethyl ether level of about 5.7 volume percent in the conversion solution. The remainder of the aluminum hydride reactant solution was added while maintaining the reaction temperature at 73° C. through ether removal. The final reaction mixture was maintained at this temperature under mild agitation for a period of about two hours. After this reaction period, the resulting product crystals were recovered and separated from the residual liquid phase.

Analysis of the product crystals after drying indicated these to be substantially all non-solvated, alpha-aluminum hydride having a particle size greater than 10 microns.

(b) Following the same procedure as described in (a) above, a substantially identical aluminum hydride reactant solution was fed into a conversion solution composed of 700 milliliters of an azeotropic mixture of one part by volume benzene to 1.35 parts by volume of 2,4-dimethyl pentane (B.P. 75.4° C.) combined with quantities of LiAlH₄, LiBH₄ and diethyl ether as in the previous run. The resulting conversion solution had a reflux temperature of 72.9° C. After adding the 20 milliliters of aluminum hydride reactant to effect nucleation while maintaining the temperature constant through ether removal, additional reactant solution was added without ether removal until the reflux temperature was 71° C. and the ether volume percent in the conversion solution correspondingly was about 5.7 percent. This temperature was maintained during the remainder of the run.

Macrocrystalline particles of non-solvated, alpha-aluminum hydride again constituted the major product constituent.

(c) The procedure was repeated utilizing either n-hexane (B.P. 68° C.)-diethyl ether solution or a 1:1 volume mixture of benzene-n-hexane (B.P. 72° C.)-diethyl ether solution as conversion liquids. In both cases, the conversion liquids had 5.7 volume percent diethyl ether. Good yield of large crystals of non-solvated hexagonal crystalline, aluminum hydride (identified as alpha-aluminum hydride) were obtained at the conversion liquid reflux temperatures of about 64.5° C. and 68.5° C., respectively.

In a manner similar to that described for the foregoing example a 1:1.5 volume benzene-3-methylpentane mixture (B.P. 67° C.), a 1:1.5 volume benzene-2,3-dimethylbutane mixture (B.P. 64° C.), 3-methylpentane (B.P. 63° C.), a 1:1 volume benzene-2,2-dimethylbutane mixture (B.P. 60° C.), 2,3-dimethylbutane (B.P. 58° C.), 2,2-dimethylbutane (B.P. 50° C.) and the like can be admixed with up to about 8 volume percent diethyl ether to provide conversion solutions suitable for preparing macrocrystalline, non-solvated, hexagonal aluminum hydride utilizing the present improved process.

With these crystallizing liquids, the resulting conversion liquids containing 8 volume percent diethyl ether are respectively 62°, 59°, 58°, 55°, 53° and 45° centigrade. At the most preferred ether level of 5.7 volume percent, the boiling points of the respective conversion solutions are 63, 60, 59, 56, 54 and 46° centigrade.

Various modifications can be made in the present invention without departing from the spirit or scope thereof for it is understood that we limit ourselves only as defined in the appended claims.

We claim:

1. In a process for preparing a macrocrystalline, hexagonal, substantially non-solvated aluminum hydride by (a) introducing at substantially atmospheric pressure an aliphatic ethereal solution of aluminum hydride into a crystallizing liquid having a higher boiling point than said ether thereby to provide a conversion solution for crystallizing said macrocrystalline aluminum hydride particles, said ethereal aluminum hydride reaction solution containing a complex light metal hydride of formula $M_1^{+1}M_2^{+3}H_4$ in an amount to provide a complex light metal hydride/aluminum hydride gram mole ratio of from about 0.025 to about 1 and the concentration of said aluminum hydride in said ethereal solution ranging from about 0.05 to about 3, (b) maintaining the resulting conversion solution at a predetermined reflux temperature above the boiling point of said etheral solution for a period of time whereupon hexagonal, substantially non-solvated aluminum hydride particles nucleate and grow therein, and (c) separating and recovering macrocrystalline, hexagonal, substantially non-solvated aluminum hydride particles from the residual liquid phase, the improvement which comprises; employing a crystallizing solvent comprising benzene, aliphatic hydrocarbons or mixtures thereof having a normal boiling point above that of said diethyl ether but below 80° C. and controllably introducing said ethereal aluminum hydride reactant solution into said crystallizing solvent while maintaining the reflux temperature of the resulting conversion solution at from about 45° C. up to the boiling point of said crystallizing solvent and maintaining the volume percent of ether at a maximum of about 6 percent and providing a maximum of about 8 volume percent diethyl ether in said conversion solution during the nucleation and growth of said macrocrystalline aluminum hydride particles therein.

2. The improved process as defined in Claim 1 wherein the resulting conversion solution is maintained at from about 60 to about 73° C.

3. The improved process as defined in Claim 1 wherein the crystallizing solvent is a member selected from the group consisting of
   (a) an azeotrope of 1 part by volume benzene to 1.15 parts by volume cyclohexane,
   (b) an azeotrope of 1 part by volume benzene to 1.35 parts by volume 2,4-dimethyl pentane,
   (c) a 1:1 volume mixture of benzene-n-hexane, and
   (d) n-hexane.

4. The improved process as defined in Claim 3 wherein the resulting conversion solution prepared using each of said crystallizing solvents contains about 5.7 volume percent diethyl ether.

References Cited
FOREIGN PATENTS
840,572    7/1960    Great Britain.

OTHER REFERENCES
M. J. Rice et al.: Non-Solvates Aluminum Hydride, Technical Report of ONR, Astia AS No. 106967, Aug. 1, 1956.

CARL D. QUARFORTH, Primary Examiner

R. L. TATE, Assistant Examiner